3,108,040
ANTIULCER CONCENTRATE AND PROCESS FOR PREPARING SAME

Karl Folkers, Plainfield, N.J., assignor to Merck & Co., Inc., Rahway, N.J., a corporation of New Jersey
No Drawing. Filed Feb. 4, 1960, Ser. No. 6,637
9 Claims. (Cl. 167—55)

This invention is concerned generally with novel compositions which promote the healing of peptic ulcers, and with processes of preparing these compositions. More particularly, it relates to novel concentrates of an antipeptic ulcer dietary factor having the highest antiulcer activity yet reported for any natural substance, and with novel methods of preparing these concentrates starting with green plant material.

This application is a continuation in part of application Serial No. 453,937, filed September 2, 1954, now abandoned.

I have concluded that the disease of peptic ulcer is essentially a conditioned nutritional deficiency. By conditioned is meant that the deficiency is brought about, influenced, or aggravated by stress, as for example, by excessive physical exertion or by mental strain. The nutritional factor involved is a water-soluble, chloroform-insoluble substance found in green plant material. It is heat labile and therefore partially destroyed or completely lost on cooking. I have designated this material brasinine.

The novel concentrates with which this invention is concerned and which contain the new antipeptic ulcer dietary factor, brasinine, are characterized as promoting the healing of peptic ulcers at a rate of approximately three times that heretofore obtainable utilizing conventional methods of therapy. These novel brasinine-active concentrates, when utilized in the therapeutic treatment of over ninety patients having a definite clinical diagnosis of peptic ulcer with demonstrable ulcer craters, have invariably resulted in the rapid healing of such peptic ulcers in every case where satisfactory follow-up studies could be conducted except in those cases where the ulcer was complicated either by hepatitis, malignant disease or pancreatitis. This rapid healing occurred whether the ulcer crater was small (0.7 centimeter in diameter) or large (4.6 centimeters in diameter) and irrespective of whether the ulcer crater was located in the esophagus, stomach, duodenum or jejunum.

A plant extract containing the antipeptic ulcer dietary factor has been prepared heretofore by pressing finely-divided cabbage material to give a so-called cabbage juice which has been demonstrated to possess antiulcer activity. This raw cabbage juice has, however, been extremely unsatisfactory as a therapeutic agent for the treatment of ulcer patients. In the first place the juice must be freshly prepared directly prior to administration since, on standing even for a single night and under refrigeration, the juice develops a strong odor and flavor which renders it extremely unpalatable and productive of nausea. Even in the case of the freshly-prepared juice, some patients are unable to drink the juice without vomiting which has necessitated the administration of the juice directly into the duodenum by means of a plastic tube. Even in those patients who are not nauseated by the raw juice, many patients develop gas, abdominal distress, bloating and more or less constipation during therapy. Moreover, previous attempts to prepare a dry or lyophilized juice have likewise been unsatisfactory because, in such processing of the whole juice, from 50 to 100% of the antipeptic ulcer potency has apparently been lost.

Contrary to these prior indications, I have discovered a method for preparing concentrated brasinine-active products which are free from the objectionable odor and flavor characteristic of raw cabbage juice, and which are stable on prolonged storage. One of these concentrated brasinine-active products, which I call brasinine syrup, is prepared by lyophilization of raw cabbage juice following a preliminary treatment of the juice to remove certain unstable and otherwise undesirable components thereof which are believed to have been at least partly responsible for the previous failures to obtain a satisfactory concentrate. These unstable, odoriferous, and ill-tasting components are removed from the raw cabbage juice by extracting the juice with a water-immiscible solvent, as for example a hydrocarbon solvent, a halogenated hydrocarbon solvent, and the like. I prefer to employ chloroform for this purpose since, in addition to removing cabbage fat, odoriferous substances and ill-tasting materials from the juice, the utilization of this solvent effects precipitation of other inactive impurities (possibly in part by extracting from the juice peptizing agents which may maintain such impurities in colloidal suspension) whereby these impurities can be readily removed by filtration. The extracted and filtered cabbage juice is placed under vacuum to remove traces of chloroform, and is then concentrated in vacuo and/or lyophilized to approximately 5% of its original volume. This material, which is referred to as brasinine syrup, is relatively stable on storage, and is relatively free of odoriferous and ill-tasting components. It is well tolerated by ulcer patients and is effective in the therapeutic treatment of such patients using as a daily dose an amount of brasinine syrup equivalent to that derived from one liter of cabbage juice. This daily dose contains on the average 30 g. of solid material dissolved in 50 ml. of solution.

I prefer to utilize in such therapy, however, a concentrated brasinine-active product which I refer to as brasinine concentrate, and which, at a dosage level of three to six grams per day, exhibits the rapid curative action on peptic ulcers shown by a daily dose of one liter of raw cabbage juice which contains on the average over 35 g. of solid material. This highly-active antiulcer concentrate is prepared, in accordance with the present invention, by first extracting raw cabbage juice with a water-immiscible solvent, such as chloroform, filtering the extracted cabbage juice, and evacuating the filtered juice to remove traces of chloroform as in the preparation of brasinine syrup. This extracted and filtered juice is then brought into contact with activated charcoal which, I have discovered, possesses a remarkable selective adsorption action for the brasinine-active constituent in the juice. The resulting charcoal adsorbate, which ordinarily contains less than about 10% of the solid material originally present in the juice, possesses, however, substantially all of the brasinine-(antiulcer)active constituent since the spent liquor, after such charcoal adsorption treatment, has been tested clinically and found to possess no measurable antiulcer activity.

I have further discovered that this brasinine-active material can be eluted from the charcoal utilizing aqueous alkanols such as ethanol, methanol and the like. Upon evaporation in vacuo or lyophilization of the resulting alcoholic eluate, there is obtained about 1½ to 3 grams of solid brasinine concentrate for each liter of cabbage juice. This brasinine solid concentrate, which is standardized for clinical use on the basis that three to six grams possesses an antiulcer activity equal to or greater than that possessed by one liter of cabbage juice, is effective in promoting the healing of peptic ulcers in human patients at a rate approximately three times that obtained heretofore utilizing conventional modes of ulcer therapy; it is 100 times as potent in antiulcer action as is raw cabbage juice, and is 10 times as potent as the nonvolatile portion of such juice. This brasinine concentrate is water-soluble, chloroform-insoluble and heat labile, and is further characterized by its property of being adsorbed by activated charcoal from its solution in water or 50% aqueous methanol, and being eluted from such charcoal adsorbate by 85% aqueous methanol.

It has been asserted heretofore that the antiulcer factor present in green vegetables is a fat-soluble substance which has been referred to as vitamin U. Contrary to these prior teachings, I have discovered that the disease of peptic ulcer is a condition resulting from a deficiency of a water-soluble nutritional factor, to which I have given the name brasinine.

Moreover, I have further discovered that brasinine is adsorbed by charcoal and eluted therefrom by aqueous alcohol. This discovery was unobvious since animal assays of the spent filtrate from the charcoal adsorption indicated that the anti-ulcer principle was not adsorbed, but rather that impurities, inactive in this respect, were actually removed from the solution during the charcoal treatment. Only after extensive clinical evaluation was it possible to demonstrate that it is, in fact, the material adsorbed by charcoal, that is the brasinine concentrate, which possesses antiulcer-activity.

The charcoal adsorption operation can be conducted either batchwise by stirring the activated charcoal (for example Norite), with the juice or, if desired, the adsorption can be carried out columnwise by passing the extracted and filtered cabbage juice through a column of activated charcoal. When the batch method is used, it has been found convenient to utilize approximately one part of activated charcoal for treating approximately 20 to 100 parts of extracted juice. The adsorption operation is conveniently conducted by maintaining the extracted cabbage juice and the activated charcoal in intimate contact, as by stirring the mixture together for a period of several hours, preferably about fifteen hours, and at a temperature of approximately 20–30° C. The activated charcoal adsorbate is recovered from the resulting slurry by filtration or centrifugation.

The brasinine-active material is then eluted from the charcoal adsorbate utilizing an aqueous lower alkanol, preferably aqueous ethanol or methanol. If desired, the charcoal adsorbate can be eluted with an acidic aqueous alkanol solution, preferably an aqueous ethanolic or aqueous methanolic solution of hydrochloric acid, although other non-oxidizing volatile acids may be utilized in conjunction with the aqueous alkanol solution. This elution can be carried out either batchwise or in a column. When either of the foregoing eluting conditions are employed, the activated charcoal is conveniently stirred with the eluting solvent at room temperature until elution is substantially complete; when this elution is carried out at room temperature, it has been found convenient to stir the charcoal adsorbate with the aqueous lower alkanol for a period of about two hours. I ordinarily employ aqueous ethanol or methanol as the eluting solvent, and preferably 85% aqueous ethanol or 85% aqueous methanol; approximately 10 parts of such eluting solvent is conveniently used per part of activated charcoal adsorbate when batch operations are employed. The charcoal adsorbate may be subjected to a further extraction treatment utilizing an aqueous lower alkanol solution or an aqueous acidic lower alkanol solution (for example 85% aqueous ethanol containing approximately 1/10% HCl), and the resulting extract combined with the original eluate.

The eluate is then evaporated in vacuo to small volume and the concentrated solution lyophilized to give a white, hydroscopic, amorphous material in an amount equivalent to about 0.3 to 0.6% of the weight of the extracted and filtered cabbage juice. This amorphous material, which is referred to as brasinine concentrate, is stable on storage, is adapted for capsulating and, when administered in the form of capsules to patients with peptic ulcers, is effective in promoting the rapid healing of such ulcers at a dosage level of approximately 3 to 6 grams per day. For preparing such capsules, it is advisable to mix this brasinine solid concentrate with a carrier such as magnesium stearate to form a free-flowing finely-divided material. If desired, other solid pharmaceutical carriers such as sugar, starch, talc, and the like, can be mixed with the brasinine solid concentrate in place of, or in addition to, the magnesium stearate, and, if tablets are to be formed, a disintegrating agent and a lubricating agent are also added to the mixture. The resulting composition is subdivided into dosage units which should contain at least about 10 mg., preferably between about 100 mg. and 1000 mg., of the brasinine solid concentrate.

Alternatively, instead of lyophilizing, the eluates can be evaporated under vacuum until the ethanol or methanol component is completely removed, and can then be further concentrated until the volume of the concentrated eluate corresponds to approximately 1–2% of the volume of the extracted cabbage juice starting material. This concentrated solution form of brasinine concentrate is likewise effective in promoting the rapid healing of peptic ulcers when administered to patients at a dosage level of approximately 10 to 20 cc. (2 to 4 teaspoonfuls) per day. This brasinine liquid concentrate is entirely odorless and tasteless and is tolerated by ulcer patients with no discomfort whatsoever.

Whereas I ordinarily utilize cabbage juice as the starting material for preparing the concentrated brasinine-active products, brasinine syrup, brasinine solid concentrate and brasinine liquid concentrate, I may also employ the extracted juice of other green plants which are likewise rich in the brasinine-active constituent.

A series of 100 patients having a definite clinical diagnosis of peptic ulcer, including two additional cases with gastric ulcers which were ultimately proven to be due to malignant disease, were treated with brasinine syrup prepared in accordance with the procedure described hereinabove.

The usual clinical and laboratory diagnostic studies were carried out for peptic ulcer including blood examinations (cell count, Kahn test and sedimentation rate determination), stool examination, and fractional alcohol gastric analysis. Whenever possible, X-ray examinations to determine ulcer crater healing time were carried out at 7 to 14 day intervals. Some of the patients with gastric ulcer were also examined with a gastroscope, and, in addition, 80 patients also had uropepsin determinations. Of the 102 patients studied, and omitting from consideration the two patients with malignant gastric ulcers, there were eighty patients in which the ulcer craters could be accurately followed by serial X-ray studies. One of these 80 patients (case No. 9) had both a gastric ulcer and a duodenal ulcer. The case distribution of these 81 ulcer cases by location of the peptic ulcer is as follows: esophageal 3; gastric 18; duodenal 59; and jejunal 1.

The duration of the patients' symptoms, prior to the present study, varied from as little as ten days to as long as thirty years and, in the acute attacks, symptoms had been present from four days to five years. While, at first, patients were accepted only if they were free from complicating symptoms, in view of numerous requests for this therapy by patients not meeting these qualifications, it was decided to accept for therapy with brasinine syrup all patients who had a clearly established diagnosis for peptic ulcer. Accordingly, a number of patients included in this study had complications present, such as mild degrees of pyloric obstruction, bleeding, pancreatitis, hepatitis, and varying degrees of psychoneurosis.

All of the patients received a limited type of bland diet which consisted of only heated food. They received no routine medications but were allowed symptomatic therapy for abdominal pain and restlessness in the earlier stages of treatment when necessary. The brasinine syrup was administered to each patient in a daily dose equivalent to that derived from one liter of cabbage juice; the volume of brasinine syrup per dose, depending on the strength of the particular concentrate, was ordinarily between 50 and 60 cc. in volume although, in a few instances where a more concentrated brasinine syrup was used, the daily dose was about 20 to 30 cc.

The method of evaluating the improvement in the peptic ulcer cases, resulting from the treatment with brasinine syrup, was by determining the ulcer-crater healing time as shown by X-ray. Since this method is only applicable to those patients with clearly outlined ulcer craters and is therefore not applicable for evaluation of those cases where no crater could be demonstrated, the day on which pain relief occurred was also determined for each patient. However, in each of the 81 ulcer cases reported hereinbelow, the presence of an ulcer crater had been unequivocally demonstrated; accordingly, the time at which pain relief occurred is merely confirmatory of the healing of the ulcer crater as proven by X-ray examination.

The results of this brasinine syrup therapy of the 81 ulcer cases is summarized in the table set forth hereinbelow which is divided into four sections; the first section represents the results of therapy in three cases of esophageal ulcer; the second, one case of jejunal ulcer; the third, 18 cases of gastric ulcer; and the fourth, 59 cases of duodenal ulcer. Column 1 of this table gives the case number; column 2, the age and sex of the patient treated; columns 3 and 4 give the duration of the total illness and of the present attack, respectively; column 5 gives the location of the peptic ulcer; column 6 records the diameter of the ulcer in centimeters at the start of treatment as measured by X-ray; column 7 reports the activity of the patient i.e., whether treated while in the hospital, home in bed, ambulatory, or at work; column 8 gives the day of pain relief; and column 9 the day on which complete healing of the ulcer crater occurred as determined by X-ray. This table is as follows:

ESOPHAGEAL ULCER

| Case No. | Age and sex | Duration total illness | Duration present attack | Location ulcer | Diam. of ulcer in cms. | Patient activity | Day of pain relief | Ulcer crater healing time in days |
|---|---|---|---|---|---|---|---|---|
| 16 | 69M | 4 yrs | 3 mos | Posterior wall | 2.0 | Ambulatory | 10th | 10 |
| 33 | 63M | 7 yrs | 4 mos | Anterior wall | 1.0 | At work | 3d | 9 |
| 40 | 65F | 2+ yrs | 2 yrs | Posterior wall | 1.0 | Ambulatory | 2d | 10 |

JEJUNAL ULCER

| Case No. | Age and sex | Duration total illness | Duration present attack | Location ulcer | Diam. of ulcer in cms. | Patient activity | Day of pain relief | Ulcer crater healing time in days |
|---|---|---|---|---|---|---|---|---|
| 102 | 48F | 16 mos | 3 mos | Submarginal | 0.4 | At work | None? | 14 |

GASTRIC ULCER

| Case No. | Age and sex | Duration total illness | Duration present attack | Location ulcer | Diam. of ulcer in cms. | Patient activity | Day of pain relief | Ulcer crater healing time in days |
|---|---|---|---|---|---|---|---|---|
| 3 | 37M | 6 yrs | 6 wks | Prepyloric | 0.8 | Hospital | 2d | 10 |
| 7 | 35M | 12 yrs | 1 mo | Pylorus | 1.2 | do | 1st | 20 |
| 9A | 40M | 1 yr | 1 mo | Prepyloric | 0.3 | At work | 1st | 12 |
| 12 | 51M | 6+ yrs | ? | <Curvature | 1.5 | Hospital | 1st | 11 |
| 19 | 69F | 1+ yrs | 6 wks | >Curvature | 1.0 | Ambulatory | 2d | 12 |
| 21 | 29F | 6 wks | 6 wks | Mid <curvature | 0.6 | do | No pain | 22 |
| 25 | 38F | 18 yrs | 2 mos | Pylorus | 0.6 | At work | do | 17 |
| 29 | 48M | 3 yrs | 6 mos | <Curvature | 1.5 | Hospital | 2d | 16 |
| 37 | 42M | 9 yrs | 2 mos | Antrum | 0.5 | Ambulatory | 3d | 18 |
| 42 | 44F | 7 yrs | 2 wks | Pyloric canal | 0.8 | do | 5th | 27 |
| 52A | 59M | 12 days | 12 days | Prepyloric | 0.5 | Hospital | 3d | 18 |
| 52B | | | | Pars media | 4.6 | Ambulatory | 3d | 54 |
| 56 | 55F | 11 mos | 2 mos | Mid <curvature | 0.5 | do | 4th | 9 |
| 69 | 49M | 18 yrs | 1 mo | Pylorus | 0.6 | At work | 4th | 18 |
| 75 | 49F | 7 yrs | 10 days | <Curvature | 2.5 | Ambulatory | 5th | 63 |
| 82A | 53M | 19 yrs | 2+ wks | Pylorus | 1.0 x 0.6 | At work | 6th? | 14 |
| 82B | | | | Hi <Curvature | 2.5 x 1.5 | | 26th | 62 |
| 83 | 40F | 7 yrs | 3 mos | do | 2.1 x 0.8 | Ambulatory | 5th | 18 |
| 89 | 38F | 10 mos | 1 mo | do | 1.2 x 0.5 | At work | 3d | 19 |
| 97 | 48M | 15 yrs | 3 mos | Mid <curvature | 1.5 x 0.3 | Hospital | 5th | 20 |

DUODENAL ULCER

| Case No. | Age and sex | Duration total illness | Duration present attack | Location ulcer | Diam. of ulcer in cms. | Patient activity | Day of pain relief | Ulcer crater healing time in days |
|---|---|---|---|---|---|---|---|---|
| 1 | 48F | 2 yrs | 2 wks | Distal cap | 0.5 | Hospital | 7th | 9 |
| 2 | 51M | 8 yrs | 2 wks | Cap | 0.5 | do | 4th | 8 |
| 5 | 38M | 12 yrs | 1 mo | Distal cap | 0.7 | do | 3d | 9 |
| 6 | 27M | 3 yrs | 2 mos | Superior cap | 0.3 | At work | 1st | 10 |
| 8 | 45M | 1+ yrs | 1 yr | Cap | 0.5 | Hospital | 3d | 24 |
| 9B | 40M | 1 yr | 3 wks | Bulb | 0.5 | At work | 1st | 12 |
| 10 | 62M | 2 yrs | 1 wk | Cap | 1.0 | Hospital | 4th | 10 |
| 13 | 11M | 2 wks | 2 wks | Cap | 1.2 | Ambulatory | 5th | 10 |
| 15 | 58F | 8 yrs | 7 mos | Mid cap | 0.3 | Hospital | 3d | 8 |
| 17 | 47M | 15 yrs | 2 yrs | Apex cap | 0.3 | do | 4th | 8 |
| 20 | 37M | | 8 mos | Base cap | 0.8 | do | 1st | 6 |
| 23 | 27F | 5 yrs | 1 mo | Bulb | 0.4 | At work | 4th | 10 |
| 24 | 62M | 2 yrs | 10 days | Apex cap | 1.0 | Ambulatory | 2d | 12 |
| 26 | 44F | 2+ yrs | 3 wks | Base cap | 0.5 | Hospital | 3d | 15 |
| 28 | 38F | 1½ yrs | 1 wk | Apex cap | 1.0 | do | 2d | 8 |
| 30 | 47F | 7 yrs | 1 mo | do | 0.8 | do | 2d | 11 |
| 31 | 73M | 5 yrs | 6 wks | Apex bulb | 1.0 | Hospital and ambulatory | | 34 |
| 34 | 48M | 12 yrs | 3 wks | Base cap | 0.6 | At work | 5th | 9 |
| 35 | 33F | 2 yrs | 1 mo | Superior cap | 0.7 | Hospital | 3d | 14 |
| 36 | 62M | 7 yrs | 5 mos | do | 0.6 | Ambulatory | 6th | 14 |
| 38 | 34M | 2 yrs | 2 yrs | Base cap | 1.5 | Hospital | 8th | 15 |
| 39 | 27M | 10 yrs | 8 mos | Apex cap | 0.6 | At work | 6th | 12 |
| 43 | 35F | 3½ yrs | 4 mos | do | 0.8 | Hospital | 4th | 7 |
| 44 | 50F | 20 yrs | 6 mos | Mid cap | 0.8 | Ambulatory | 7th | 10 |
| 45 | 29M | 10 mos | 3 mos | Body cap | 1.4 | Hospital | 4th | 16 |
| 46 | 24F | 1 yr | 1 yr | Inferior cap | 0.5 | At work | 2d | 10 |
| 47 | 62M | 2 yrs | 3 days | Mid cap | 0.8 | Home in bed | 2d | 12 |
| 49 | 40F | 16 yrs | 10 wks | do | 0.8 | At work | 1st | 21 |
| 50 | 47F | 18 mos | 6 mos | Inferior cap | 0.5 | do | 3d | 16 |
| 53 | 66F | 14 mos | 2 mos | Anterior cap | 1.0 | do | 1st | 22 |
| 57 | 36M | 18 mos | 1 mo | Bulb | 0.4 | Ambulatory | 8th | 16 |
| 58 | 40F | 3½ yrs | 3 mos | Central bulb | 0.5 | At work | 9th | 11 |
| 59 | 49M | 3 wks | 3 wks | Post bulbar | 0.6 | do | 5th | 11 |
| 60 | 48M | 8 yrs | 2 mos | Bulb | 1.5 | Hospital | 3d | 12 |
| 62 | 51M | 4 yrs | 2 wks | Base cap | 0.7 | Ambulatory | 5th | 8 |
| 63 | 53M | 30 yrs | 3 wks | Base bulb | 1.1 | At work | 11th | 25 |

DUODENAL ULCER—Continued

| Case No. | Age and sex | Duration total illness | Duration present attack | Location ulcer | Diam. of ulcer in cms. | Patient activity | Day of pain relief | Ulcer crater healing time in days |
|---|---|---|---|---|---|---|---|---|
| 64 | 49M | 20 yrs | 6 wks | Inferior base cap | 1.3 | Ambulatory | 4th | 18 |
| 65 | 41F | 10 mos | 3 wks | do | 1.0 | At work | No pain | 18 |
| 66 | 30M | 1 yr | 1 mo | Mid bulb | 0.7 | do | 2d | 20 |
| 67 | 27M | 1 mo | 1 mo | Central bulb | 0.4 | do | 4th | 20 |
| 68 | 28M | 2½ yrs | 6 wks | Apex cap | 1.2 | Ambulatory | 6th | 9 |
| 70 | 34M | 2 yrs | 2 mos | Cap | 0.5 | At work | 6th | 23 |
| 72 | 62M | 4 yrs | 1 mo | Apex bulb | 1.2 | Ambulatory | 6th | 9 |
| 73 | 33F | 4 yrs | 4 days | Base cap | 1.0 | Hospital | 6th | 15 |
| 74 | 54M | 25 yrs | 1 mo | Post bulbar | 0.5 | At work | 3d | 9 |
| 78 | 31M | 10 yrs | 6+ mos | Bulbar or post bulbar | 0.5 | do | 4th | 14 |
| 79 | 60M | 27 yrs | 1 wk | Posterior bulb | 0.8 | Hospital | 4th | 18 |
| 81 | 33M | 5 yrs | 3 wks | Mid bulb | 1.0 | do | 2d | 15 |
| 85 | 17M | 3 mos | 3 mos | Central bulb | 0.7 | At work | 4th | 13 |
| 86 | 29M | 6 yrs | 3 mos | Mid bulb | 1.0 | Ambulatory | 5th | 14 |
| 90 | 45M | 2 yrs | 6 mos | Superior cap | 0.5 | At work | 4th | 14 |
| 91 | 30F | 5 yrs | 5 wks | Posterior inferior cap | 0.4 | Ambulatory | 5th | 14 |
| 92 | 74M | 6 yrs | 2 wks | Posterior cap | 1.0 | do | 7th | 13 |
| 93 | 41M | 17 yrs | 3 wks | do | 0.7 | At work | 5th | 14 |
| 94 | 52M | 8 yrs | 3 wks | Mid posterior cap | 1.0 | do | 8th | 20 |
| 96 | 52M | 5 yrs | 5 yrs | Apex cap | 0.5 | do | 10th | 19 |
| 98 | 48F | 5 yrs | 4 days | do | 0.4 | Ambulatory | 1st | 10 |
| 99 | 73M | 15 mos | 3 wks | Base bulb | 0.6 | Hospital | No pain | 10 |
| 101 | 40M | 7 yrs | 1 mo | Base cap | 0.5 | At work | 2d | 11 |

Analysis of these cases shows that the average crater healing time for patients with gastric ulcer treated with brasinine syrup was about 16 to 17 days, and for patients with duodenal ulcer, about 13 to 14 days. The average crater healing time using conventional forms of treatment has been reported to be about 45 days for gastric ulcers and about 35 days for duodenal ulcers.

In a subsequent study, patients with peptic ulcer of various types have been similarly treated with brasinine liquid concentrate and with capsules containing brasinine solid concentrate prepared as described hereinabove, with favorable results on the healing of the ulcer craters comparable with those obtained with brasinine syrup and reported hereinabove.

The following examples illustrate methods of preparing the brasinine syrup and brasinine concentrates of the present invention in accordance with the general procedures outlined hereinabove, but it is to be understood that these examples are given primarily by way of illustration and not of limitation.

Example 1

Eighteen kilograms of finely-minced fresh cabbage are squeezed dry in a hydraulic press to give 12 liters of raw cabbage juice which is obtained in the form of a pale-green, milky solution. This raw cabbage juice is continuously extracted with chloroform for about 24 hours thereby moving 6.3 grams of brownish-green, odoriferous fat which is obtained as a chloroform-soluble fraction. The residual pale-yellow, aqueous solution contains a small amount of white solid which is removed by filtration, and the filtered solution is evacuated for a short time to remove traces of chloroform to give about 12 liters of chloroform-extracted, filtered cabbage juice. Two liters of this extracted cabbage juice are concentrated by lyophilization to 5% of its original volume to give approximately 100 ml. of brasinine syrup having a solid content of about 60 grams.

A second portion of the extracted cabbage juice, volume 8200 ml. (pH 5.2), is mixed with 100 grams of activated charcoal (Norite), and the mixture is stirred overnight at room temperature thereby adsorbing brasinine-active material on the charcoal. The resulting mixture is filtered and the activated charcoal adsorbate is pressed as dry as possible. The adsorbate is then mixed with 1000 ml. of an 85% aqueous methanol solution (i.e. 85 parts methanol to 15 parts of water), the mixture is stirred at room temperature for a period of about two hours, thereby eluting brasinine-active material from the charcoal adsorbate. The resulting eluate is separated from the charcoal adsorbate by filtration, and the adsorbate is further eluted by stirring at room temperature for an additional period of two hours with 1000 ml. of an 85% aqueous methanol solution containing 2 cc. of concentrated aqueous hydrochloric acid solution. The latter eluate is separated from the spent adsorbate by filtration, the two eluates are combined, the mixture is evaporated in vacuo to small volume, and the resulting solution is concentrated by lyophilization to give 10 grams of brasinine concentrate which is obtained in the form of a white hydroscopic, amorphous material.

Four grams of this white, hydroscopic material are dissolved in 30 ml. of a 50% aqueous methanol solution, and this solution is chromatographed over a column containing an adsorbent consisting of a mixture of 60 grams of activated charcoal (Norite), and 60 grams of diatomaceous silica (Supercel), thereby absorbing brasinine-active material on said adsorbent. The resulting adsorbate is then eluted with 1500 milliliters of an 85% aqueous methanol solution, the resulting eluate is evaporated in vacuo to small volume, and the concentrated solution is lyophilized to give 3.8 grams of brasinine concentrate in the form of a colorless amorphous material.

Brasinine syrup and brasinine concentrates prepared as described in this example, when administered to patients having a definite clinical diagnosis of peptic ulcer at a daily dosage equivalent to the material derived from one liter of cabbage juice, are effective in promoting the rapid healing of such ulcers.

Example 2

Six hundred pounds of finely shredded cabbage are pressed to give approximately 30 to 45 gallons of raw cabbage juice. Approximately 10 lbs. of diatomaceous silica (Hyflo Supercel) are added to the juice, the mixture is stirred for about 15 minutes, filtered and the filter cake washed with about 8 gallons of water.

The clarified raw cabbage juice (volume about 35 to 50 gal.) is then vigorously agitated with about 40 gallons of chloroform for a period of about one hour, the resulting emulsion is filtered, and the chloroform layer containing cabbage fat and unwanted, odoriferous materials is separated. The aqueous layer is heated at a temperature of about 35° C. under reduced pressure for a period of about one hour, thereby removing all traces of chloroform.

The chloroform-free aqueous layer (which ordinarily averages about 150 liters in volume corresponding to about 120 liters of fresh cabbage juice) is then mixed with about 13 lbs. of activated charcoal (Norite A), and the mixture is agitated at a temperature of about 0 to 10° C. for a period of approximately 16 hours. The mixture is filtered, and the charcoal adsorbate is washed with about three-quarters of a gallon of water. The spent filtrate and washings are discarded. (In this connection, this spent filtrate, which includes those fractions of the chloroform-extracted cabbage juice which are not adsorbed on activated charcoal and which contains over 85% of the solid components of the extracted cabbage juice, was also tested in patients and was found to possess no antiulcer activity whatsoever.)

The charcoal adsorbate is mixed with about 18 gallons of an 85% aqueous ethanol solution, and the mixture is agitated at room temperature for a period of about 30 minutes. The mixture is filtered, and the charcoal adsorbate is washed with about three-quarters of a gallon of 85% aqueous ethanol solution. The spent charcoal adsorbate is discarded. The aqueous ethanol eluate and wash are combined and evaporated in vacuo at a maximum liquid temperature of 35° C. to a volume of approximately 5 gallons. This concentrated material is then further evaporated in vacuo to give about 6 liters of a light-brown to straw-colored solution whose nonvolatile residue is ordinarily about 6%–12%. This solution is packaged for clinical use in 2 oz. plastic bottles, and each bottle contains 50 milliliters of solution having dissolved therein all the solid material derived by this procedure from two liters of cabbage juice. This brasinine liquid concentrate is standardized on the basis that the brasinine activity of 50 ml. of such concentrate are equal to or greater than the brasinine activity of one liter of fresh cabbage juice. The bottles of this brasinine concentrate are stored under refrigerated conditions until required for use.

Alternatively, the charcoal eluate is concentrated further in vacuo to produce brasinine liquid concentrates wherein all of the solid material derived by this procedure from two liters of cabbage juice is contained in a solution having a volume of 10 to 25 ml.

For freeze drying, the Norite eluate derived from 120 liters of fresh cabbage juice is evaporated in vacuo to a volume of 1500 milliliters (which ordinarily contains about 24% solids) and this material is lyophilized to produce about 360 to 720 grams of brasinine solid concentrate which is obtained in the form of a white hygroscopic amorphous substance. This material is compounded with 10% its weight of magnesium stearate, and is placed in capsules containing about 0.5 gram of brasinine solid concentrate per capsule. Approximately six to twelve capsules (which contain a total of 3 to 6 grams of brasinine solid concentrate corresponding in brasinine activity to at least one liter of cabbage juice) are used as a daily dosage in the therapeutic treatment of peptic ulcers.

Brasinine liquid concentrates and capsules of brasinine solid concentrate prepared as described in this example, when administered to patients having a definite clinical diagnosis of peptic ulcer at a daily dosage equivalent to the material derived from one liter of cabbage juice, are effective in promoting the rapid healing of such ulcers.

The concentrated brasinine-active products prepared in accordance with this invention, including brasinine syrup, brasinine liquid concentrate and brasinine solid concentrate are not only effective in the treatment of patients having a definite clinical diagnosis of peptic ulcer but are also valuable in prophylactic therapy. Thus, the development of peptic ulcer may be avoided by the regular adminstration of brasinine-active concentrates at a daily dosage comparable to those used in the treatment of peptic ulcer patients.

Various changes and modifications may be made in carrying out the present invention without departing from the spirit and scope thereof. Insofar as these changes and modifications are within the purview of the annexed claims, they are to be considered as part of my invention.

I claim:
1. An antiulcer-active concentrate, characterized as being water-soluble, chloroform-insoluble and heat labile, obtained by contacting defatted cabbage juice with activated charcoal thereby adsorbing antiulcer-active material on said charcoal, contacting the resulting charcoal adsorbate with an aqueous lower alkanol thereby eluting antiulcer-active material from said adsorbate, and removing volatile components from the resulting eluate.

2. An antiulcer-active concentrate, characterized as being water-soluble, chloroform-insoluble and heat labile, obtained by contacting defatted aqueous extract of green plant material with activated charcoal thereby adsorbing antiulcer-active material on said charcoal, contacting the resulting charcoal adsorbate with an aqueous lower alkanol therby eluting antiulcer-active material from said adsorbate, and removing volatile components from the resulting eluate.

3. The process of preparing antiulcer-active concentrates which comprises contacting an extract of green plant material with a water-immiscible organic solvent thereby removing fatty substances present in said extract, filtering the defatted extract, contacting the defatted and filtered extract with activated charcoal thereby adsorbing antiulcer-active material on said charcoal, contacting the resulting charcoal adsorbate with an aqueous lower alkanol thereby eluting antiulcer-active material from said adsorbate, and removing volatile components from the resulting eluate.

4. The process according to claim 3 wherein the extract of green plant material is selected from the group consisting of an aqueous extract of cabbage and cabbage juice and wherein the water-immiscible organic solvent is chloroform.

5. In the process of producing a concentrated antiulcer-active extract of green plant material having enhanced ulcer-healing activity, the step which comprises contacting an aqueous extract of green plant material with a water-immiscible organic solvent thereby removing fatty substances present in said extract to produce an aqueous solution of antiulcer-active material relatively free of odoriferous and ill-tasting components.

6. The process according to claim 5 wherein the green plant material is cabbage and the water-immiscible organic solvent is chloroform.

7. In the process of producing a brasinine-active concentrate having enhanced ulcer-healing activity from cabbage juice, the step which comprises contacting defatted cabbage juice with activated charcoal thereby adsorbing brasinine-active material present in said juice on said charcoal.

8. In the process of producing a brasinine-active concentrate having enhanced ulcer-healing activity, the step which comprises contacting an activated charcoal adsorbate containing adsorbed brasinine-active material with an aqueous lower alkanol thereby eluting brasinine-active material from said adsorbate.

9. The process according to claim 8 wherein the aqueous lower alkanol is selected from the group consisting of 85% aqueous methanol and 85% aqueous ethanol.

References Cited in the file of this patent
UNITED STATES PATENTS
2,390,679    Arnold _____ Dec. 11, 1945

(Other references on following page)

OTHER REFERENCES

J. Am. Med. Assoc., July 23, 1949, p. 1068.

Cheney: (1) Stanford Medical Bulletin, 6: 2, pp. 334–338, 1948.

Cheney: (2) U. Am. Dietetic Assoc., 1950, 26: 9, pp. 668–672.

Cheney: (3) Stanford Medical Bulletin, 8: 2, pp. 144–161, 1950.

Winton: Structure and Composition of Foods, vol. II, 1935, p. 237.

Sherman: J. Bact., vol. 31, p. 96, 1936.

Ghosh. Chem. Abst., vol. 34, 1940, p. 2472(a).

Sumtson: Chem. Abst., vol. 44, 1950, p. 6986(b).

Prochazka: Chem. Abst., vol. 46, 1952, p. 194(b).

Gray's Manual of Botany, American Book Company, 1950, p. 707, p. 1093, p. 1554.

Cheney: California Medicine, vol. 70, No. 1, pages 10–15, January 1949.